United States Patent [19]

McEwan et al.

[11] 3,887,446

[45] June 3, 1975

[54] ELECTROCHEMICAL PREPARATION OF METALLIC TELLURIDES

[75] Inventors: William S. McEwan, China Lake, Calif.; Melvin Miles, Murfreesboro, Tenn.

[73] Assignee: The United States of America as represented by the Secretary of the Navy, Washington, D.C.

[22] Filed: July 26, 1974

[21] Appl. No.: 492,110

[52] U.S. Cl. .................. 204/86; 204/291; 423/509
[51] Int. Cl. ......................... C01b 19/00; B01k 3/06
[58] Field of Search ........................ 204/86; 423/509

[56] References Cited
UNITED STATES PATENTS

| | | | |
|---|---|---|---|
| 3,065,048 | 11/1962 | Conn et al. | 423/509 |
| 3,129,056 | 4/1964 | Muir | 423/509 |
| 3,306,701 | 2/1967 | Anderson et al. | 423/509 |
| 3,355,245 | 11/1967 | Ernst | 423/509 |
| 3,494,730 | 2/1970 | Tai et al. | 423/509 |

OTHER PUBLICATIONS

Hagenmuller, Mat. Res. Bull., Vol. 5, No. 6, pp. 367–375, pub. by Perganion Press, Inc., 1970.

*Primary Examiner*—F. C. Edmundson
*Attorney, Agent, or Firm*—R. S. Sciascia; Roy Miller; Lloyd E. K. Pohl

[57] ABSTRACT

Tellurides of cadmium lead and tin are prepared by an electrochemical method wherein a tellurium cathode and a anode of the metal which will form the positive ion of the telluride are used in conjunction with ammonium acetate-acetic acid buffer solutions. Mercury tellurides are prepared by using a tellurium anode and a platinum cathode to produce Te-ions and then adding a mercury salt. The tellurides prepared are useful as semiconductors and in other areas.

3 Claims, No Drawings

ELECTROCHEMICAL PREPARATION OF METALLIC TELLURIDES

BACKGROUND OF THE INVENTION

1. Field of the Invention.

This invention relates to methods for preparing tellurides. More particularly, this invention relates to electrochemical methods for preparing tellurides.

2. Description of the Prior Art

The use of various tellurides as semiconductor materials has long been known. In the prior art, the tellurides have been prepared by chemical methods which are somewhat time consuming and difficult. It would be advantageous if a simple, inexpensive electrochemical method for their preparation. However, to the best of the inventor's knowledge, no such method is described in the prior art.

SUMMARY OF THE INVENTION

According to this invention, CdTe, PbTe and SnTe are prepared by utilizing Cd, Pb or Sn and Te electrodes in an ammonium acetate-acetic acid buffer solution. HgTe is prepared by electrochemically generating $Te^{--}$ ions in solution with a platinum electrode and then directly adding a soluble mercury (II) salt such as mercury acetate.

DESCRIPTION OF THE PREFERRED EMBODIMENTS

The preferred embodiments of this invention can best be described by relating specific examples.

EXAMPLE 1 — THE PREPARATION OF CdTe

Tellurium electrodes were prepared by sealing pieces of tellurium in glass tubing and making mercury contacts to copper leads. The total resistance of these electrodes ranged from about 5 to about 15 ohms. These electrodes were used as sources of $Te^{--}$ ions.

Cadmium rods were used as sources of cadmium ions.

Ammonium acetate-acetic acid buffer solution was prepared by adding acetic acid to 1M ammonium hydroxide to give a pH of 4.5.

All chemicals (Cd, Te, $NH_4OH$ and HOAc) used were, as received, reagent grade chemicals.

A one-compartment, beaker type, electrochemical cell containing the buffer solution (4.5 pH ammonium acetate-acetic acid) and cadmium and tellurium electrodes was used, in conjunction with a Beckman Electroscan 30 instrument, to conduct experiments. Nitrogen purified by bubbling through Fieser's solution was used to remove oxygen from the buffer solution and the electrochemical cell was placed in a plastic bag and kept under positive nitrogen pressure during electrolysis as an added precaution against oxygen.

Three separate experiments, each involving the passage of 0.010 ampere for 100 seconds followed by 0.100 ampere for 8000 seconds through tellurium cathodes with 0.5 cm² geometrical areas and large cadmium anodes (10 cm² geometrical areas) were run. In each experiment, a precipitate formed. The precipitates from the three experiments were collected, washed with water, centrifuged and dried under vacuum at 100°C for at least 12 hours. Portions of the precipitates were then sent to two laboratories for independant analysis. The results of the analyses along with theoretical values appear in the following table.

TABLE - EXPERIMENTAL AND THEORETICAL RESULTS

FOR THE FORMATION OF CdTe BY THE PASSAGE OF 801 COULOMBS

| Electrode Weight Loss, g | Precipitate Weight, g | Atomic absorption Analysis Lab A | Lab B |
|---|---|---|---|
| EXPERIMENT 1 | | | |
| 0.459 Cd | 0.977 | 42.66% Cd | 45.2% Cd |
| 0.517 Te | | 55.84% Te | 55.5% Te |
| EXPERIMENT 2 | | | |
| 0.480 Cd | 0.992 | 44.79% Cd | 42.5% Cd |
| 0.514 Te | | 53.32% Te | 58.5% Te |
| EXPERIMENT 3 | | | |
| 0.478 Cd | — | 45.63% Cd | 47.2% Cd |
| 0.513 Te | | 46.58% Te | 53.6% Te |
| THEORETICAL | | | |
| 0.467 Cd | 0.997 | 46.83% Cd | |
| 0.530 Te | | 53.17% Te | |

EXAMPLE 2 — THE PREPARATION OF PbTe AND SnTe

The tellurides of lead and tin are prepared in the same way as that described for the preparation of CdTe above with the exception, of course, that the anodes are prepared from lead and tin respectively rather than cadmium.

EXAMPLE 3 — THE PREPARATION OF HgTe

HgTe was prepared by utilizing the apparatus and technique of Example 1 with the exception that a platinum electrode was used in lieu of the cadmium one of Example 1 to electrochemically generate $Te^{--}$ ions in the ammonium acetate-acetic acid buffer solution and then mercury (II) acetate was added to the buffer solution to react with the $Te^{--}$ ions present and form, as a precipitate, HgTe. Atomic absorption analysis of a sample thus prepared by two laboratories gave 63.17% and 61.7% for mercury and 35.78% and 38.9% for tellurium. This compares very favorably with the theoretical values of 61.72% Hg and 38.88% Te for HgTe.

What is claimed is:

1. A method for preparing a telluride comprising the steps of:
   a. providing a tellurium cathode;
   b. providing an anode of a material selected from the group consisting of cadmium, lead and tin;
   c. placing said cathode and anode in an ammonium acetate-acetic acid buffer solution from which oxygen is removed and excluded; and
   d. passing electrical current through said cathode and anode to generate positive ions at the anode and negative ions at the cathode which combine to form said telluride.

2. A method according to claim 1 wherein said buffer solution has a pH of 4.5.

3. A method for preparing HgTe comprising the steps of:
   a. providing a tellurium cathode;
   b. providing a platinum anode;
   c. placing said cathode and anode in an ammonium acetate-acetic acid buffer solution from which oxygen has been removed and is excluded;
   d. passing an electrical current through said cathode and anode to produce $Te^{--}$ ions; and
   e. adding mercury (II) acetate to the buffer solution to react with the $Te^{--}$ ions.

* * * * *